J. A. PEACH.

CATCHING GLOVE.

APPLICATION FILED AUG. 17, 1907.

Reissued July 27, 1909.

12,996.

2 SHEETS—SHEET 1.

Inventor

John A. Peach.

Witnesses

P. F. Nagle.

H. G. Dieterich

By Wiedersheim & Fourbaulds

Attorneys

ANDREW. S. GRAHAM CO., PHOTO-LITHOGRAPHERS, WASHINGTON, D. C.

J. A. PEACH.

CATCHING GLOVE.

APPLICATION FILED AUG. 17, 1907.

Reissued July 27, 1909.

12,996.

2 SHEETS—SHEET 2.

Inventor

John A. Peach.

Witnesses

P. F. Nagle.

H. G. Dieterich

By

Wiedersheim & Van Dauts

Attorneys

ANDREW. R. GRAHAM CO., PHOTO-LITHOGRAPHERS, WASHINGTON, D. C.

UNITED STATES PATENT OFFICE.

JOHN A. PEACH, OF GLOVERSVILLE, NEW YORK, ASSIGNOR TO CONSOLIDATED SPORTING GOODS MANUFACTURING COMPANY, A CORPORATION OF NEW JERSEY.

CATCHING-GLOVE.

No. 12,996. Specification of Reissued Letters Patent. Reissued July 27, 1909.

Original No. 800,169, dated September 26, 1905, Serial No. 226,707. Application for reissue filed August 17, 1907. Serial No. 389,086.

*To all whom it may concern:*

Be it known that I, JOHN A. PEACH, a citizen of the United States, residing at Gloversville, in the county of Fulton and State of New York, have invented new and useful Improvements in Catching-Gloves, of which the following is a specification.

This invention has relation to catching-gloves; and it consists in the novel construction and arrangement of its parts, as hereinafter shown and described.

Figure 1:
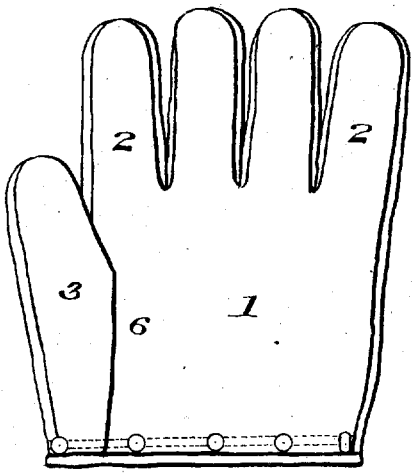
Figure 2:
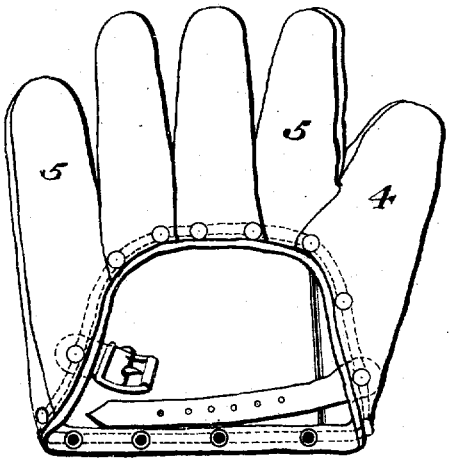

The object of the invention is to provide a catching-glove consisting of an inner and outer glove, one nested within the other and both being made of leather. The inner glove has a pad of peculiar construction attached at the ends of the fingers and thumb, said pad being adapted to rest in the palm of the hand and extend along the inner sides of the fingers between the two gloves. The gloves also are of especial construction particularly adapted for the purpose intended. The inner and outer gloves may be secured together by the ordinary glove-fasteners, as shown in Figures 1 and 2, or in lieu thereof suitable lacing or any other fastening means may be employed. The said fastening means extends around the wrist and back of the gloves, along the lower edges thereof. The gloves may be easily and readily separated for the purpose of placing in new pads, if necessary.

Figure 3:
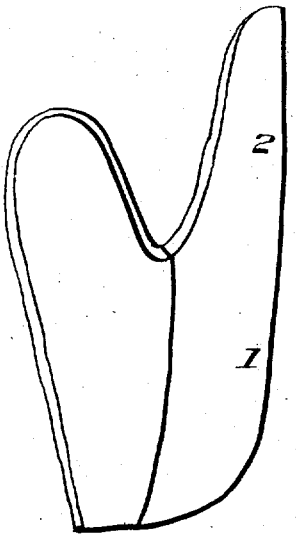
Figure 4:
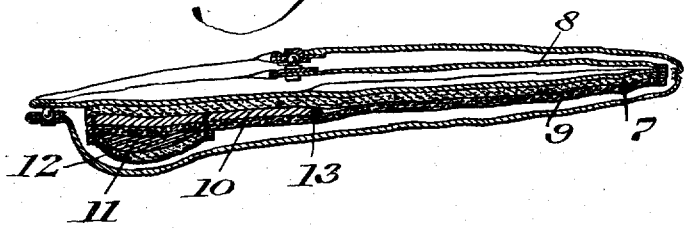
Figure 5:
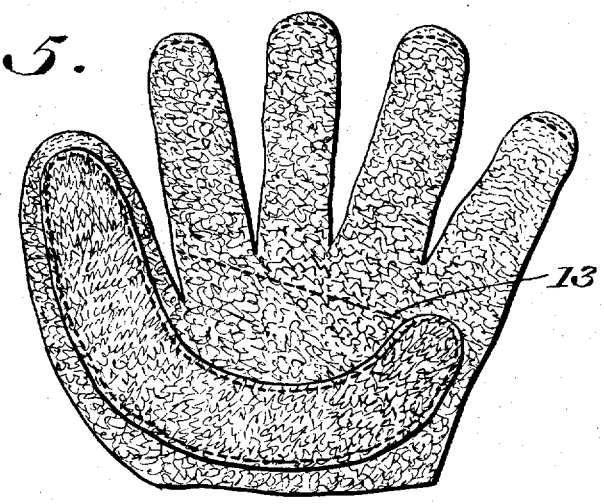
Figure 6:
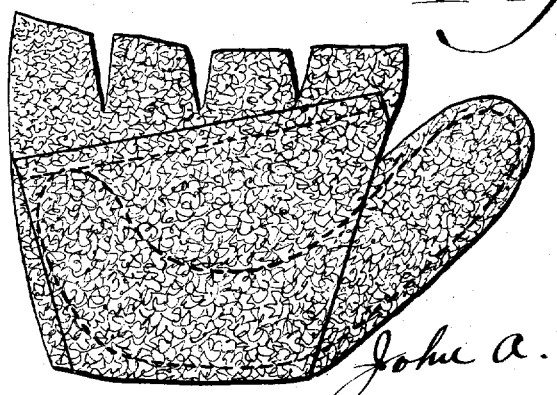

In the accompanying drawings, Fig. 1 is a perspective view showing the front of the outer glove member. Fig. 2 is a perspective view showing the back of the outer glove member. Fig. 3 is a perspective view showing the method of inserting the thumb and the seam at the forefinger. Fig. 4 is a longitudinal vertical sectional view of the glove, showing the inner glove nested within the outer glove. Fig. 5 is a side elevation of the pad; and Fig. 6 is an elevation of the pad with the fingers broken away, showing the reverse side thereof.

The inner and outer glove members are made on the same pattern, it being understood that the dimensions of the inner glove are sufficiently smaller to permit the same to slip within the outer glove.

The palm-piece 1 is provided with the inner finger-facings 2 2. The thumb consists of the inner piece 3, which extends over the tip end of the thumb to the wrist of the glove, and the outer piece 4, which also extends from the tip end of the thumb to the lower back edge of the glove. The backs of the fingers 5 5 extend from the finger-tips to the back edge of the glove. The seams between the said parts are located between the fingers and on the back of the glove, with the exception of the seam 6, which extends from the base of the thumb to the wrist. As illustrated in Figs. 1, 2, and 4, the inner and outer gloves may be secured together with ordinary metallic glove-fasteners; but, as above stated, such fasteners may be substituted by lacing or any other securing means without departing from the spirit of the invention. In view of the fact that the inner glove is the same in construction with the outer glove, the description above given applies to both. The padding consists of the piece 7, provided with fingers and a thumb. Said piece is secured at the tips of the fingers and at the tip of the thumb to the tips of the fingers and thumb of the inner glove 8. Otherwise the said pad-piece 7 is not attached to the said glove. An additional pad-piece 9 also provided with fingers to conform to the fingers of the glove 8, is attached at the tips of the fingers and the tip of the thumb to the inner glove 8, but over the pad-piece 7. At the palm the pad-piece 10 is interposed between the pad-piece 7 and the pad-piece 9. Said pad 10 is secured by stitching to the pad-piece 9. At the base of the palm and extending along the longitudinal axis of the thumb is a pad 11, which is substantially crescent-shaped and is held in position by the pad-covering 12, which is also substantially of the shape of a crescent and which is stitched to the pad-piece 9 and the pad 10, as illustrated in Figs. 4, 5, and 6. It will thus be seen that a glove is provided which thoroughly protects the inner portions of the fingers, the palm of the hand, the wrist, and the joints between the thumb and the palm. If desired, webbings may be inserted in the outer glove between the thumb and the forefinger or between any of the fingers. The seam 13, which secures the pad 10, extends diagonally across the palm of the pad-piece 9 at the base of the fingers thereof. It will thus be seen that the inner glove may be readily slipped from the outer glove and that any of the pads or pieces thereof may be removed or replaced.

Where I use the word "complete" in the claims as referring to the outer and inner members, I refer to the fact that each of the gloves comprises complete covering for the fingers, thumb and back of the hand whether the covering for the fingers be in the form of separate finger members therefor or mit portions.

To assemble the glove, the inner glove is placed upon the hand and the outer glove is drawn down over the inner glove and the two gloves are then secured together along their lower edges.

Having thus described my invention, what I claim as new and desire to secure by Letters Patent, is:—

1. A glove consisting of separable inner and outer members made on the same pattern, one adapted to nest within the other, a pad interposed between the glove members and being attached to the inner member only.

2. A glove consisting of inner and outer members, one adapted to nest within the other and a suitable securing means for the said members, a pad interposed between the palms of the two members, and having integral finger portions which extend between the fingers of the two glove members, said pad being secured at the ends of the finger portions only to the inner glove member.

3. A glove consisting of two members one nested within the other and having suitable securing means, a pad interposed between the palms, fingers and thumb of the two members and being secured at the tips of the fingers and thumb to the inner glove member, a second pad also interposed between the palms, fingers and thumb of the two glove members and being secured at the tip ends of its fingers and thumbs to the first said pad, a third pad interposed between the two first said pads, a crescent-shaped pad located at the base of the second said pad and extending along the base of the palm and the longitudinal axis of the thumb.

4. A glove consisting of complete outer and inner members, each having thumb and palm portions, means for detachably securing the members together and a crescent-shaped pad located between the members and extending along the base of the palm and the longitudinal axis of the thumb.

5. A glove formed of complete outer and inner members the inner member consisting of a support or lining having separated finger portions thereon, a backing connected with said support and having separated finger portions, a padding on said support also having corresponding separated finger portions, and the said outer member consisting of separated finger portions in which the finger portions of the inner member and the pads thereof are seated, whereby each finger portion is provided with its separate and independent pad, and means for securing the said outer and inner members together around the back opening and at the wrist.

6. A glove formed of complete outer and inner members the inner member consisting of a support or lining having separated finger portions thereon, a backing connected with said upport and having separated finger portions, a padding on said support also having corresponding separated finger portions, a crescent shaped pad upon the first pad extending along the base portion and the thumb of the glove and said outer member consisting of separated finger portions in which the finger portions of the inner member and the pads thereof are seated, whereby each finger portion is provided with its separate and independent pad, and means for securing the said outer and inner members together around the back opening and at the wrist.

In testimony whereof I affix my signature in presence of two subscribing witnesses.

JOHN A. PEACH.

Witnesses:
MERRILL B. ALLISON,
F. WEYLAND FOSTER.